(12) United States Patent
Pan et al.

(10) Patent No.: US 12,724,331 B2
(45) Date of Patent: Sep. 1, 2026

(54) ELECTRONIC DEVICE WITH ADJUSTABLE PHOTOGRAPHIC DEVICE, SUPPORT ASSEMBLY AND BRACKET THEREOF

(71) Applicant: WISTRON CORPORATION, New Taipei City (TW)

(72) Inventors: Chien Lin Pan, New Taipei City (TW); Wensien Siao, New Taipei City (TW); Kuan Hsun Huang, New Taipei City (TW); Jhe Ci Lin, New Taipei City (TW); Bao Jun Chen, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 144 days.

(21) Appl. No.: 18/764,032

(22) Filed: Jul. 3, 2024

(65) Prior Publication Data

US 2025/0264786 A1 Aug. 21, 2025

(30) Foreign Application Priority Data

Feb. 15, 2024 (TW) ................................ 113105367

(51) Int. Cl.
*G03B 17/56* (2021.01)

(52) U.S. Cl.
CPC ................................. *G03B 17/561* (2013.01)

(58) Field of Classification Search
None
See application file for complete search history.

(56) References Cited

U.S. PATENT DOCUMENTS

2019/0265760 A1* 8/2019 Jan ....................... G03B 17/561
2026/0049686 A1* 2/2026 Pan ...................... F16M 11/041

FOREIGN PATENT DOCUMENTS

CN 217843312 U 11/2022

* cited by examiner

*Primary Examiner* — Rodney E Fuller
(74) *Attorney, Agent, or Firm* — Brooks Kushman P.C.

(57) ABSTRACT

An electronic device and a support assembly are provided. The support assembly includes a bracket and a frame. The bracket includes a bracket main body, a movable member, a first sliding member, and a second sliding member. The bracket main body has a receiving portion. The movable member is connected to the bracket main body and is in contact with the first sliding member. The first sliding member is movable relative to the bracket main body, and includes a contacting surface. The second sliding member is movable relative to the bracket main body, and has a force-receiving portion. Each contacting surface is in contact with each force-receiving portion. The frame includes a frame main body and an extension portion connected to the frame main body that is detachably located in the receiving portion. The movable member moves to enable each second sliding member to contact each of two extension portions.

20 Claims, 9 Drawing Sheets

ELECTRONIC DEVICE WITH ADJUSTABLE PHOTOGRAPHIC DEVICE, SUPPORT ASSEMBLY AND BRACKET THEREOF

CROSS-REFERENCE TO RELATED APPLICATION

This application claims the priority and benefit of Taiwan Patent Application No. 113105367 filed on Feb. 15, 2024, also published as Taiwan Patent No. I909333B which issued on Dec. 21, 2025, the disclosure of which is hereby incorporated in its entirety by reference herein.

BACKGROUND

Technical Field

The disclosure relates to an electronic device, and in particular, to a support assembly and a bracket of an electronic device with an adjustable photographic device.

Related Art

A common photographic device usually needs to be disassembled and assembled through a complicated means such as a tool. In this way, when a camera needs to be replaced or adjusted, a user cannot intuitively and quickly perform an operation.

SUMMARY

An embodiment of the disclosure provides a support assembly. The support assembly includes a bracket and a frame. The bracket includes a bracket main body, a movable member, a first sliding member, at least one second sliding member, and an elastic element. The bracket main body has a receiving portion. The movable member is connected to the bracket main body, and includes an actuating portion. The first sliding member has a first end and a second end opposite to each other, and is movable relative to the bracket main body along a first direction. The second end of the first sliding member has at least one contacting surface. The actuating portion of the movable member is in contact with the first end. The at least one second sliding member each has a third end and a fourth end opposite to each other, and is movable relative to the bracket main body along a second direction, each third end has a force-receiving portion, and each of the at least one contacting surface of the first sliding member is in contact with the force-receiving portion of each of the at least one second sliding member. The frame includes a frame main body and at least one extension portion. The at least one extension portion is connected to the frame main body, and is detachably located in the receiving portion. The fourth end of each of the at least one second sliding member is in contact with each of the at least one extension portion.

In some embodiments, the bracket further includes an elastic element, the at least one second sliding member is two second sliding members, and the elastic element is located between the two second sliding members and connected to the two second sliding members.

In some embodiments, a side of each extension portion toward the at least one second sliding member has a limiting structure, and when the fourth end of each of the at least one second sliding member contacts the corresponding extension portion, limiting structures limit movement of the bracket along the first direction.

In some embodiments, each limiting structure is a tooth-shaped limiting portion, the bracket further includes two elastic pieces, each elastic piece has an engaging portion corresponding to a shape of the limiting portion, and when the fourth end of each of the at least one second sliding member contacts each of the at least one extension portion, each engaging portion contacts the corresponding extension portion.

In some embodiments, two ends of each elastic piece are bent toward the extension portion to form the engaging portion.

In some embodiments, each limiting structure is a tooth-shaped limiting portion, the fourth end of each of the at least one second sliding member has a tooth section arranged along the first direction, when two extension portions of the frame extend into the receiving portion of the bracket, each tooth section corresponds to each limiting portion, and when the fourth end of each of the at least one second sliding member contacts each of the at least one extension portion, the tooth section of each of the at least one second sliding member is engaged with the corresponding limiting portion.

In some embodiments, each limiting structure is a convex portion protruding toward a side of each of the at least one second sliding member, the fourth end of each of the at least one second sliding member has a concave portion recessed inward along the second direction, when two extension portions of the frame extend into the receiving portion of the bracket, each convex portion corresponds to each concave portion, and when the fourth end of each of the at least one second sliding member contacts each of the at least one extension portion, the concave portion of each of the at least one second sliding member is engaged with the corresponding convex portion.

In some embodiments, each limiting structure is a concave portion recessed inward at the side of each extension portion toward the at least one second sliding member, the fourth end of each of the at least one second sliding member has a convex portion protruding outward along the second direction, when two extension portions of the frame extend into the receiving portion of the bracket, each convex portion corresponds to each concave portion, and when the fourth end of each of the at least one second sliding member contacts each of the at least one extension portion, the convex portion of each of the at least one second sliding member is engaged with the corresponding concave portion.

In some embodiments, each limiting structure is an anti-slip sheet, attached to the side of each extension portion toward the at least one second sliding member.

In some embodiments, the frame main body further includes a plane support portion.

Further, an embodiment of the disclosure provides a bracket. The bracket includes a bracket main body, a movable member, a first sliding member, at least one second sliding member, and an elastic element. The bracket main body has a receiving portion. The movable member is connected to the bracket main body, and includes an actuating portion. The first sliding member has a first end and a second end opposite to each other, and is movable relative to the bracket main body along a first direction. The second end of the first sliding member has at least one contacting surface. The actuating portion of the movable member is in contact with the first end. The at least one second sliding member each has a third end and a fourth end opposite to each other, and is movable relative to the bracket main body along a second direction, the third end of each of the at least one second sliding member has a force-receiving portion, and each of the at least one contacting surface of the first sliding member is in contact with the force-receiving portion of each of the at least one second sliding member.

In some embodiments, the bracket further includes two elastic pieces, and two ends of each elastic piece are bent outward to form an engaging portion.

In some embodiments, the fourth end of each of the at least one second sliding member has a tooth section arranged along the first direction.

In some embodiments, the fourth end of each of the at least one second sliding member has a concave portion recessed inward.

In some embodiments, the fourth end of each of the at least one second sliding member has a convex portion protruding outward.

Further, an embodiment of the disclosure provides an electronic device with an adjustable photographic device. The electronic device includes a bracket, a frame, and a photographic element. The bracket includes a bracket main body, a movable member, a first sliding member, at least one second sliding member, and an elastic element. The bracket main body has a receiving portion. The movable member is connected to the bracket main body, and includes an actuating portion. The first sliding member has a first end and a second end opposite to each other, and is movable relative to the bracket main body along a first direction. The second end of the first sliding member has at least one contacting surface. The actuating portion of the movable member is in contact with the first end. The at least one second sliding member each has a third end and a fourth end opposite to each other, and is movable relative to the bracket main body along a second direction, the third end of each of the at least one second sliding member has a force-receiving portion, and each of the at least one contacting surface of the first sliding member is in contact with the force-receiving portion of each of the at least one second sliding member. The frame includes a frame main body and at least one extension portion. The at least one extension portion is connected to the frame main body, and is detachably located in the receiving portion. The photographic element is fixed to the bracket main body. The fourth end of each of the at least one second sliding member is in contact with each of the at least one extension portion.

In some embodiments, the bracket main body further has two connecting arms, the two connecting arms are connected to the bracket main body, and the photographic element is fixed to the two connecting arms.

In summary, an electronic device with an adjustable photographic device and a support assembly thereof are provided in an embodiment. A photographic element may be selectively disassembled or assembled on a bracket. When a receiving portion of the bracket is inserted into an extension portion of a frame, a user may operate a movable member to pivot the movable member, to push a first sliding member through an actuating portion of the movable member, and then enable each second sliding member to contact each extension portion, to complete assembly. When the bracket is intended to be disassembled, only the movable member needs to be operated, to keep the second sliding member away from the extension portion, so that the bracket can be disassembled from the frame. The frame may be fixed to a different position based on a usage requirement.

DETAILED DESCRIPTION

Figure 1:
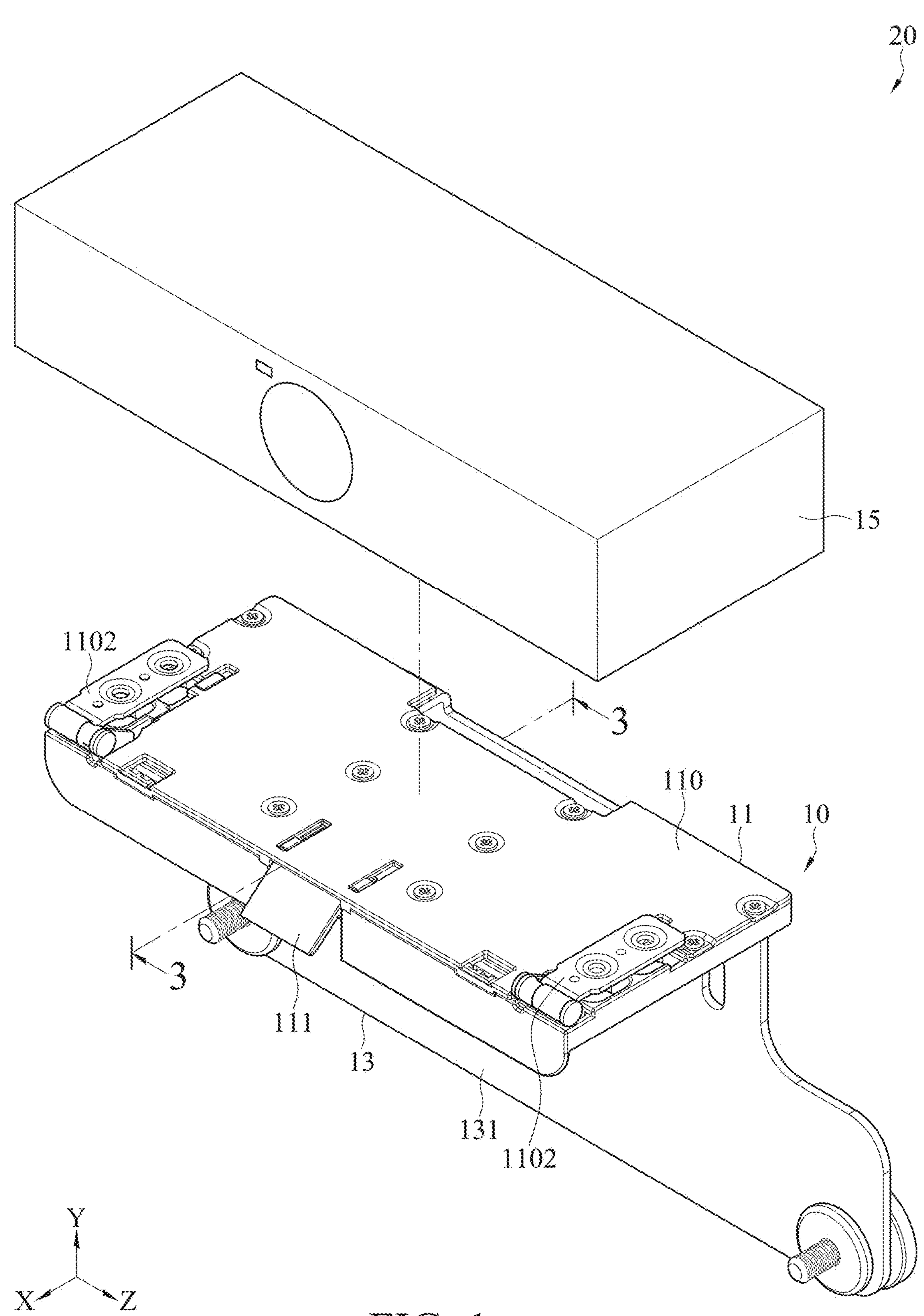
FIG. 1 is a three-dimensional view of an electronic device with an adjustable photographic device according to some embodiments.
Figure 2:
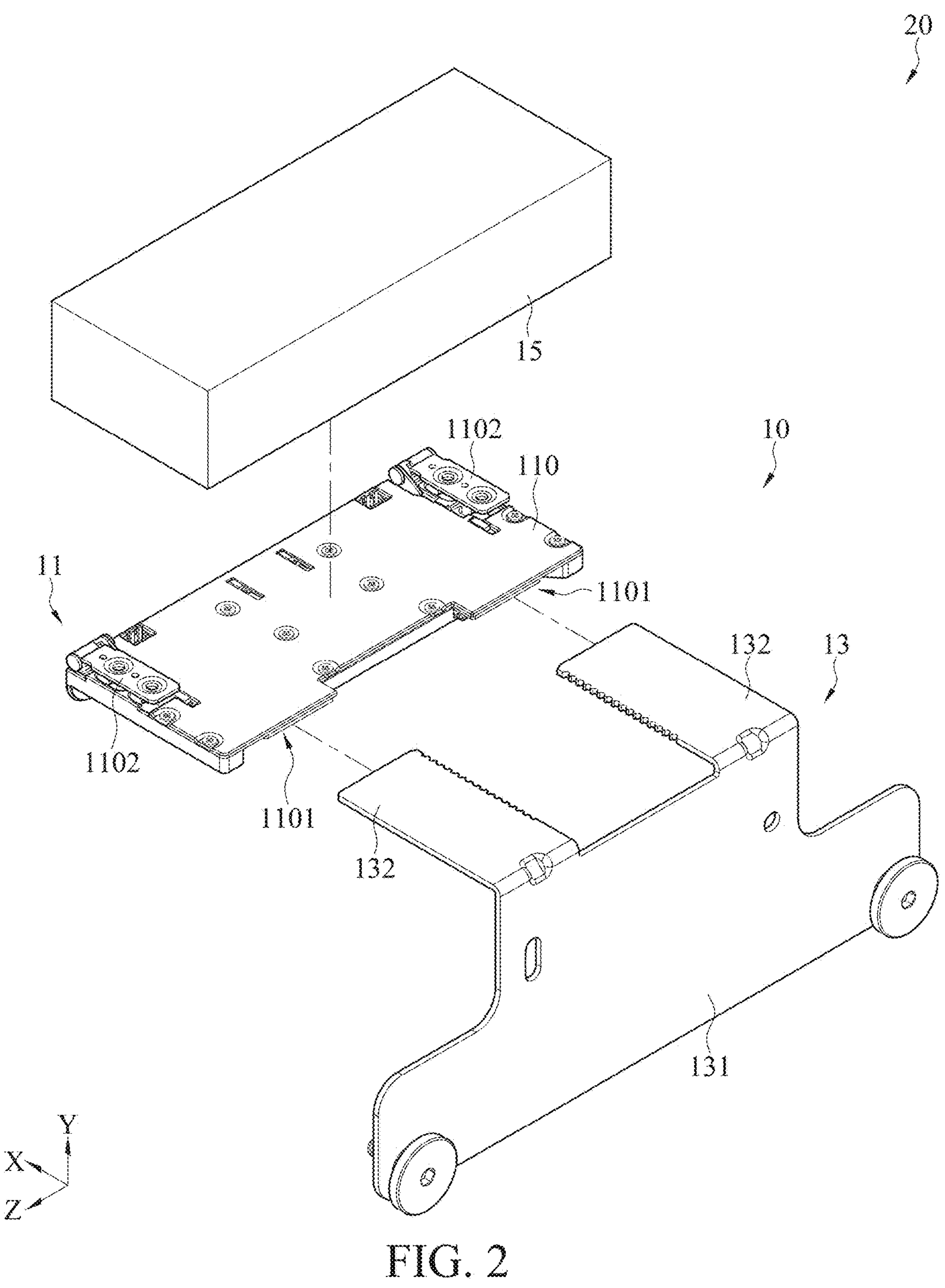
FIG. 2 is an exploded view of the electronic device with an adjustable photographic device according to the embodiments of FIG. 1.

Refer to FIG. 1 and FIG. 2. FIG. 1 is a three-dimensional view of an electronic device with an adjustable photographic device according to some embodiments. FIG. 2 is an exploded view of the electronic device with an adjustable photographic device according to the embodiments of FIG. 1. An electronic device 20 with an adjustable photographic device is hereinafter referred to as the electronic device 20. The electronic device 20 includes a support assembly 10 and a photographic element 15. The support assembly 10 includes a bracket 11 and a frame 13. As shown in FIG. 1 and FIG. 2, there are X, Y, and Z axes orthogonal to each other, and the bracket 11 may be assembled to the frame 13 along an X-axis direction. An assembly structure is to be described in detail later. In the embodiments, the photographic element 15 such as a camera may be assembled on the bracket 11. A structure of assembling the photographic element 15 is to be described in detail later. The frame 13 may be fixed to, for example, a wall, a screen, or a desktop, based on a usage condition.

Figure 3:
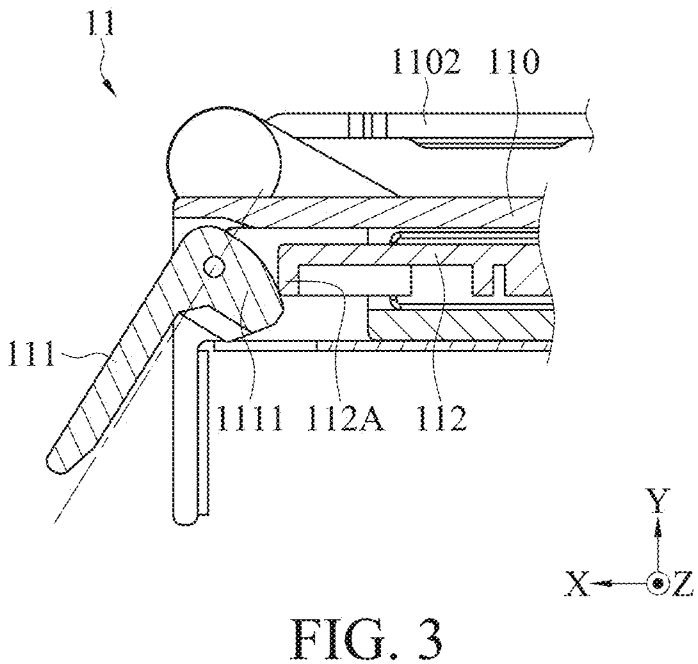
FIG. 3 is a partial sectional view (1) of a support assembly according to the embodiments of FIG. 1.
Figure 4:
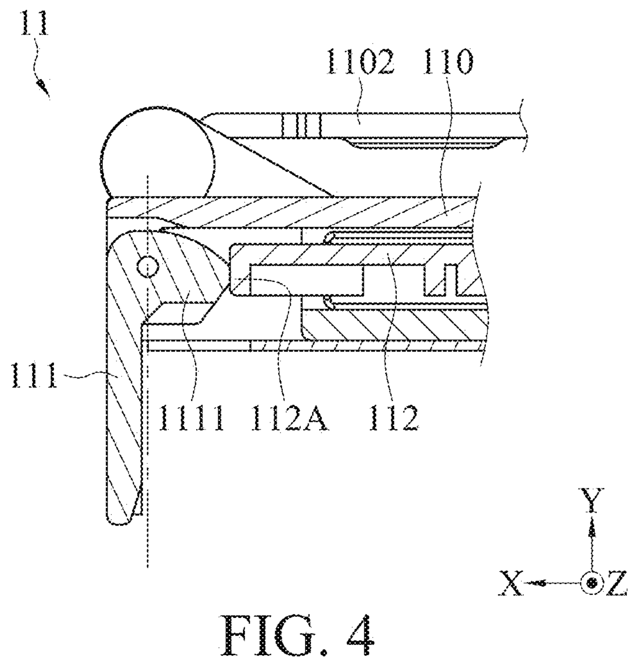
FIG. 4 is a partial sectional view (2) of a support assembly according to the embodiments of FIG. 1.
Figure 5:
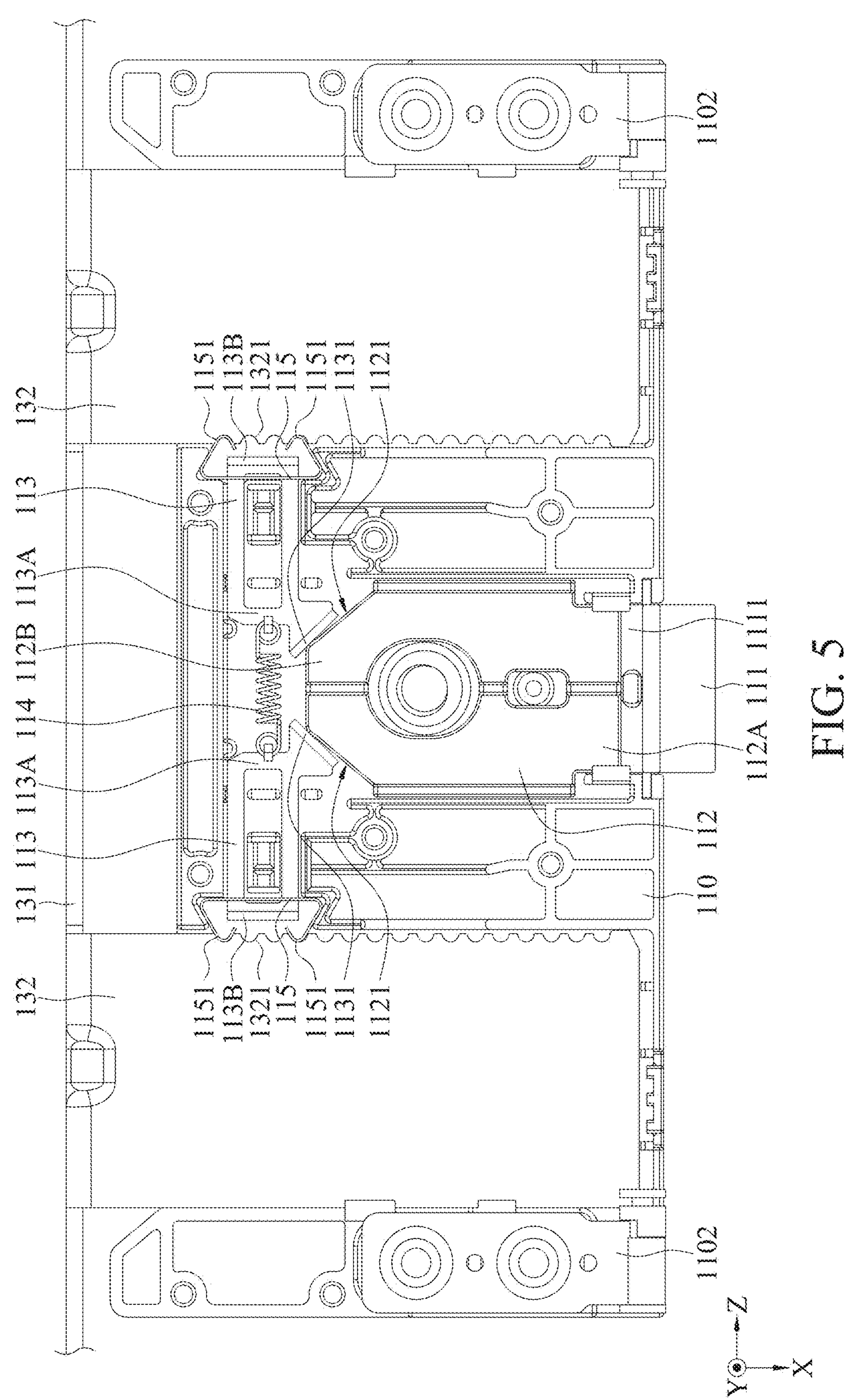
FIG. 5 is a schematic diagram (1) of an operation of a support assembly according to the embodiments of FIG. 1.
Figure 6:
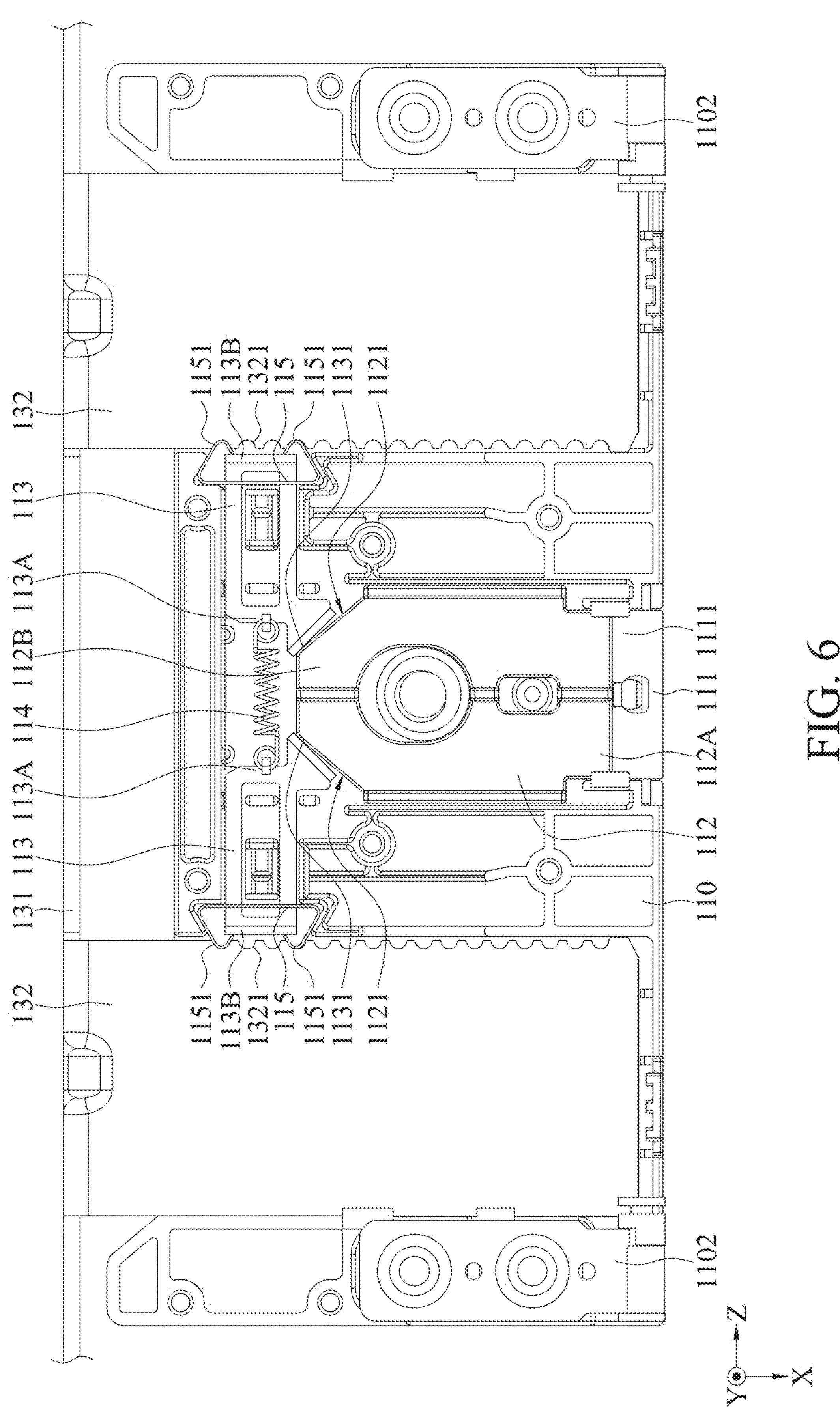
FIG. 6 is a schematic diagram (2) of an operation of a support assembly according to the embodiments of FIG. 1.

Refer to FIG. 3 to FIG. 6. FIG. 3 is a partial sectional view (1) of a support assembly according to the embodiments of FIG. 1. FIG. 4 is a partial sectional view (2) of a support assembly according to the embodiments of FIG. 1. FIG. 5 is a schematic diagram (1) of an operation of a support assembly according to the embodiments of FIG. 1. FIG. 6 is a schematic diagram (2) of an operation of a support assembly according to the embodiments of FIG. 1. FIG. 5 and FIG. 6 omit a housing on a top side of a bracket main body 110, to clearly illustrate an internal structure. The bracket 11 includes the bracket main body 110, a movable member 111, a first sliding member 112, and two second sliding members 113.

Refer to FIG. 2 again, and refer to FIG. 5 and FIG. 6. The bracket main body 110 has a receiving portion 1101. In the embodiments, the receiving portion 1101 is located in a hollow part of the bracket main body 110. As shown in FIG. 3 and FIG. 4, the movable member 111 is connected to the bracket main body 110, and includes an actuating portion 1111. In the embodiments, the movable member 111 is pivotally connected to the bracket main body 110, and is pivotable relative to the bracket main body 110.

As shown in FIG. 3 to FIG. 6, the first sliding member 112 has a first end 112A and a second end 112B opposite to each other, and is movable relative to the bracket main body 110 along the X-axis direction. The actuating portion 1111 of the movable member 111 is in contact with the first end 112A. As shown in FIG. 3 and FIG. 4, when a long axis of the movable member 111 is substantially perpendicular to the first sliding member 112, the actuating portion 1111 pushes the first sliding member 112, to enable the first sliding member 112 to move relative to the bracket main body 110. In the embodiments, a quantity of at least one contacting surface 1121 of the second end 112B of the first sliding member 112 is two.

The at least one second sliding member 113 each has a third end 113A and a fourth end 113B opposite to each other, and is movable relative to the bracket main body 110 along a Z-axis direction. In the embodiments, a quantity of second sliding members 113 is two. The third end 113A of each second sliding member 113 has a force-receiving portion 1131, and each contacting surface 1121 of the first sliding member 112 is in contact with the force-receiving portion 1131 of each second sliding member 113. In the embodiments, as shown in FIG. 5 and FIG. 6, the two second sliding members 113 are movable relative to the bracket main body 110 along the direction of the Z-axis orthogonal to the X-axis. In the embodiments, when the first sliding member 112 is pushed by the actuating portion 1111 and moves along the X-axis, the contacting surface 1121 pushes the force-receiving portion 1131, to enable the two second sliding members 113 to move in opposite directions respectively along the Z-axis. In the embodiments, each contacting surface 1121 is arranged obliquely at an acute angle with the Z-axis direction, and each force-receiving portion 1131 corresponding to each contacting surface 1121 is also arranged obliquely at an acute angle with the Z-axis direction.

In the embodiments, as shown in FIG. 5 and FIG. 6, the bracket 11 further includes an elastic element 114, and the elastic element 114 is located between the two second sliding members 113 and connected to the two second sliding members 113. In the embodiments, the elastic element 114 is connected to the two second sliding members 113 respectively along the Z-axis direction. In the embodiments, when the movable member 111 is in a buckled state, the actuating portion 1111 pushes the first sliding member 112 to move along the X-axis, and enables the first sliding member 112 to push the two second sliding members 113 to move in the opposite directions along the Z-axis, so that the elastic element 114 is elastically deformed and is stretched along the Z-axis. When the movable member 111 is released from the buckled state, the elastic element 114 contracts and enables the two second sliding members 113 to get close to each other along the Z-axis direction.

Refer to FIG. 2, FIG. 5, and FIG. 6 again. The frame 13 includes a frame main body 131 and at least one extension portion 132. In the embodiments, a quantity of extension portions 132 is two. The extension portions are integrally connected to the frame main body 131, but are not limited thereto, and may alternatively be connected in an assembly manner. In the embodiments, the two extension portions 132 is detachably located in the receiving portion 1101, to be assembled with the bracket 11. In the embodiments, the frame main body 131 may be fixed to a wall, a screen, a desktop, or the like through screwing or attaching.

As shown in FIG. 3 to FIG. 6, in the embodiments, the movable member 111 selectively moves between a first position (a position of the movable member 111 shown in FIG. 3) and a second position (a position of the movable member 111 shown in FIG. 4). When the movable member 111 is at the second position, the movable member 111 is in the buckled state, the actuating portion 1111 pushes the first end 112A of the first sliding member 112, to enable the first sliding member 112 to move along the X-axis, and enable two contacting surfaces 1121 of the second end 112B to push force-receiving portions 1131 of third ends 113A of the two second sliding members 113 respectively, to enable the two second sliding members 113 to move in the opposite directions along the Z-axis, so that the fourth end 113B of each second sliding member 113 contacts the extension portion 132. In this way, through buckling of the movable member 111 and mutual abutting between the fourth ends 113B and the extension portions 132, the bracket 11 is assembled on the frame 13, and movement along the X-axis is limited, to prevent the bracket 11 from being separated from the frame 13.

Specifically, when a user intends to assemble the bracket 11, the user may insert the receiving portion 1101 of the bracket 11 into the extension portion 132 of the frame 13. Then, the user may operate the movable member 111 to pivot the movable member 111, to push the first sliding member 112 through the actuating portion 1111 of the movable member 111, and then enable each second sliding member 113 to contact each extension portion 132, to complete assembly. When the bracket 11 is intended to be disassembled, only the movable member 111 needs to be operated, to keep the second sliding member 113 away from the extension portion 132, so that the bracket 11 can be disassembled from the frame 13. In this way, the user can quickly and intuitively disassemble the bracket 11. Alternatively, the frame 13 may be fixed to a different position based on a usage requirement.

In the embodiments, as shown in FIG. 1 and FIG. 2, the bracket main body 110 further has two connecting arms 1102. The two connecting arms 1102 are connected to the bracket main body 110. In the embodiments, the two connecting arms 1102 are pivotally connected to the bracket main body 110, and are pivotable relative to the bracket main body 110. In the embodiments, the photographic element 15 may be fixed to the two connecting arms 1102, and adjust an angle through the two connecting arms 1102.

In the embodiments, a side of each extension portion 132 toward the second sliding member 113 has a limiting structure, and when the fourth end 113B of each second sliding member 113 contacts a corresponding extension portion 132, the limiting structures limit the bracket 11 to move along the X-axis direction. This prevents a bracket 11 in an assembled state from moving relative to the frame 13. In the embodiments, the limiting structure has various implementation forms, and a detailed structure of the limiting structure is to be described in detail later.

As shown in FIG. 5 and FIG. 6, each limiting structure is a tooth-shaped limiting portion 1321, and the bracket 11 further includes two elastic pieces 115. The elastic piece 115 is sandwiched between the extension portion 132 and the second sliding member 113. Each elastic piece 115 has an engaging portion 1151 corresponding to a shape of the limiting portion 1321. When the two extension portions 132 of the frame 13 extend into the receiving portion 1101 of the bracket 11, each engaging portion 1151 is correspondingly engaged with the corresponding limiting portion 1321. In this state, because the elastic piece 115 has elasticity, a slight force exerted by the user may still enable the bracket 11 to move relative to the frame 13 for positioning. When positioning is completed and assembly is to be performed, the movable member 111 is pivoted to the second position to be in the buckled state, so that the fourth end 113B of each second sliding member 113 enables each engaging portion 1151 to contact the corresponding extension portion 132. In this way, the engaging portion 1151 of the elastic piece 115 is forced to contact the limiting portion 1321, and the bracket 11 is less likely to move relative to the frame 13 due to an external force. In the embodiments, the tooth-shaped limiting portion 1321 is arc tooth-shaped, but is not limited thereto, and may alternatively be triangular tooth-shaped. In the embodiments, as shown in FIG. 5 and FIG. 6, two ends of each elastic piece 115 are bent toward the extension portion 132 to form a triangular engaging portion 1151 to be correspondingly engaged with the limiting portion 1321.

Figure 7:
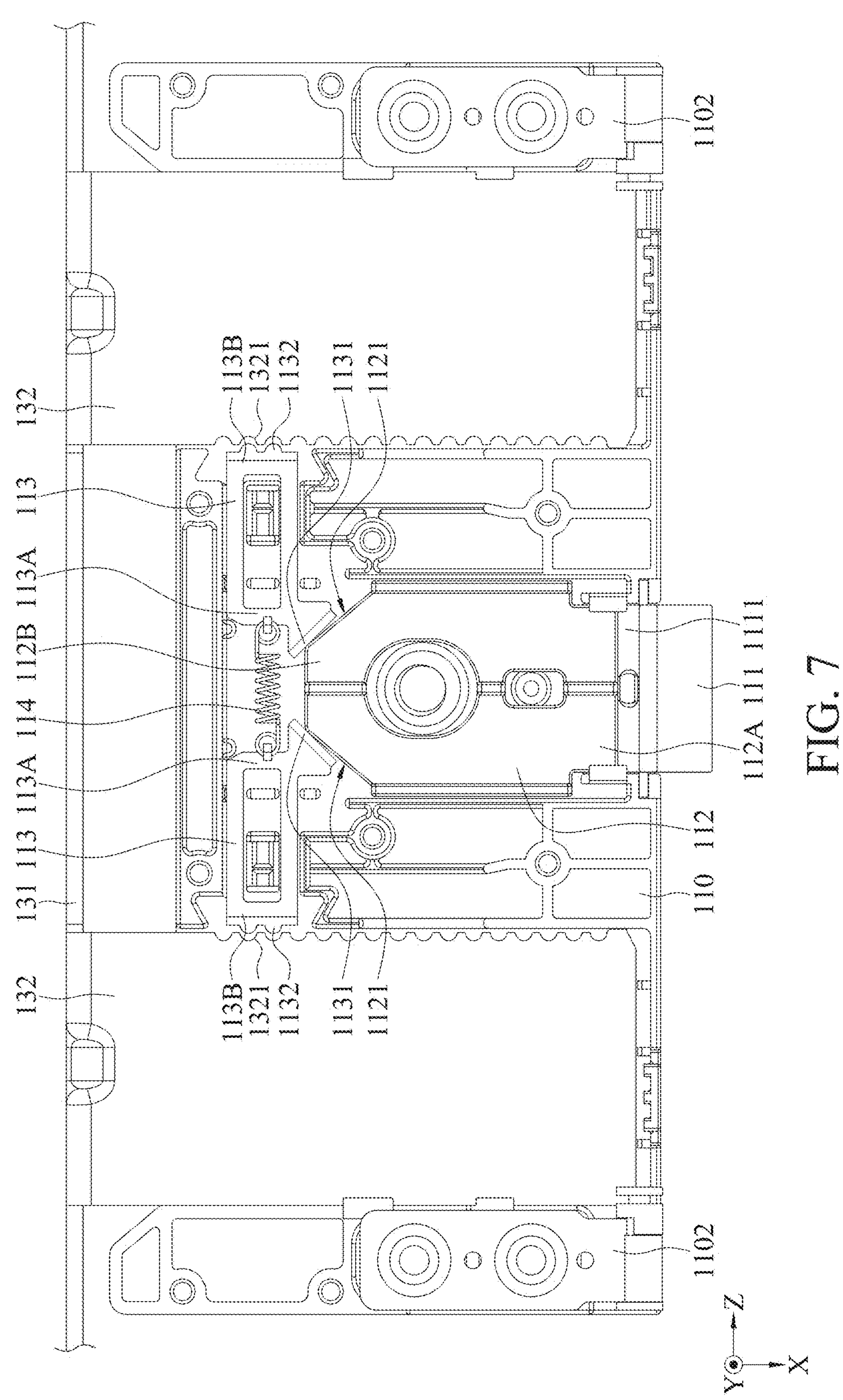
FIG. 7 is a bottom view of a support assembly according to some embodiments.
Figure 8:
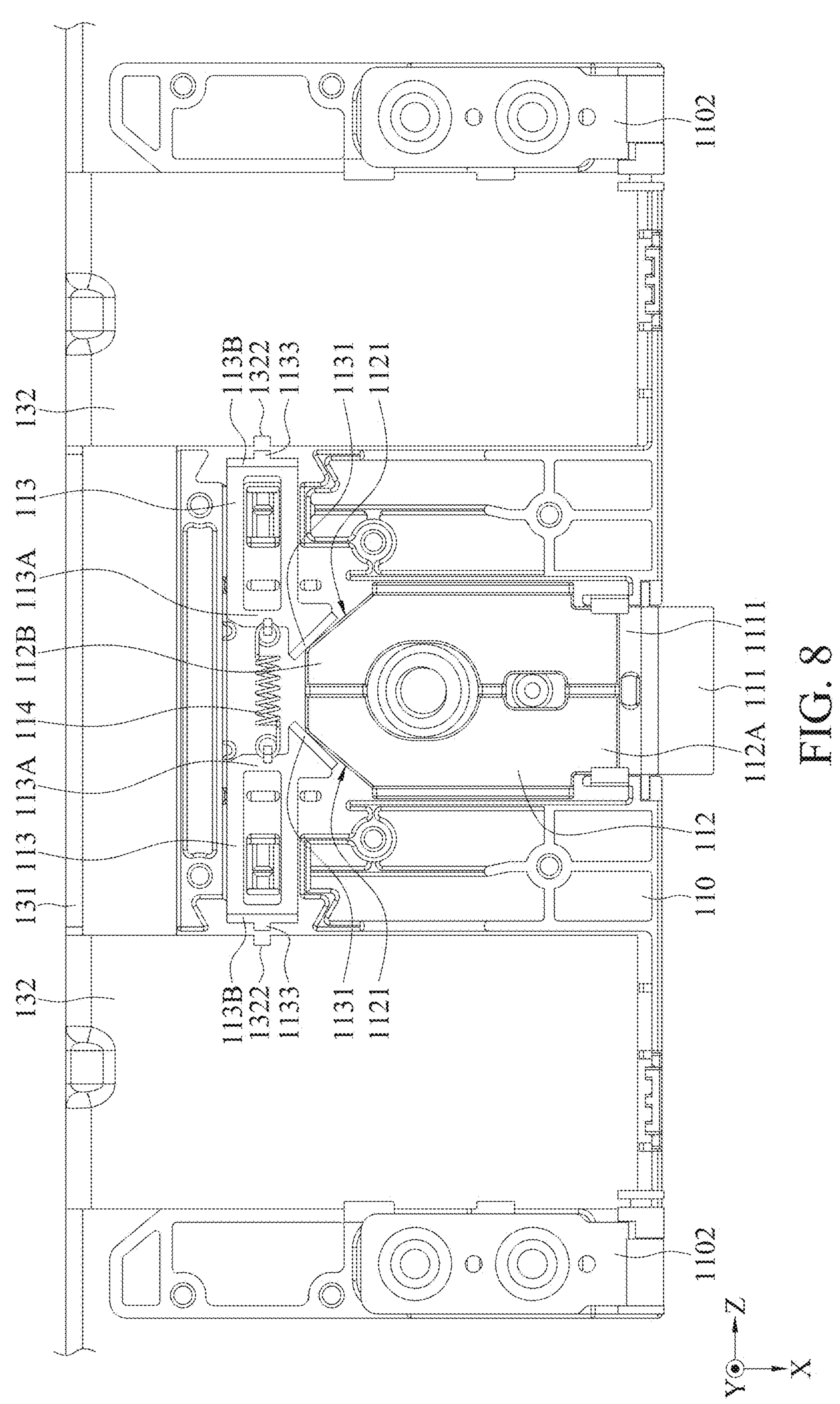
FIG. 8 is a bottom view of a support assembly according to some embodiments.

Refer to FIG. 7 to FIG. 8. FIG. 7 is a bottom view of a support assembly according to some embodiments. FIG. 8 is a bottom view of a support assembly according to some embodiments. FIG. 7 and FIG. 8 omit a housing on a top side of a bracket main body 110, to clearly illustrate an internal structure. In the embodiments of FIG. 7, each limiting structure is a tooth-shaped limiting portion 1321, and the fourth end 113B of each second sliding member 113 has a tooth section 1132 arranged along the X-axis direction. When the two extension portions 132 of the frame 13 extend into the receiving portion 1101 of the bracket 11, each tooth section 1132 corresponds to each limiting portion 1321. When positioning is completed and assembly is to be performed, the movable member 111 is pivoted to the second position to be in the buckled state, so that each tooth section 1132 of each second sliding member 113 is engaged with the corresponding limiting portion 1321. In this way, through engagement between the limiting portions 1321 of a same shape and the tooth sections 1132, movement of the bracket 11 relative to the frame 13 along the X-axis is limited.

In the embodiments of FIG. 8, each limiting structure is a concave portion 1322 recessed inward at the side of each extension portion 132 toward the second sliding member 113, and the fourth end 113B of the second sliding member 113 has a convex portion 1133 protruding outward along the Z-axis direction. When the two extension portions 132 of the frame 13 extend into the receiving portion 1101 of the bracket 11, each convex portion 1133 corresponds to each concave portion 1322. When positioning is completed and assembly is to be performed, the movable member 111 is pivoted to the second position to be in the buckled state, so that each convex portion 1133 of each second sliding member 113 is engaged with the corresponding concave portion 1322. In this way, through engagement between concave and convex structures, movement of the bracket 11 relative to the frame 13 along the X-axis is limited. In the embodiments, the limiting structure is the concave portion 1322, but is not limited thereto. Alternatively, the limiting structure may be a convex portion, and the second sliding member 113 may be provided with a concave portion. In some embodiments, each limiting structure is an anti-slip sheet, attached to the side of each extension portion 132 toward the second sliding member 113. A friction force between the second sliding member 113 and the extension portion 132 is increased, to avoid movement of the bracket 11 relative to the frame 13 along the X-axis.

Figure 9:
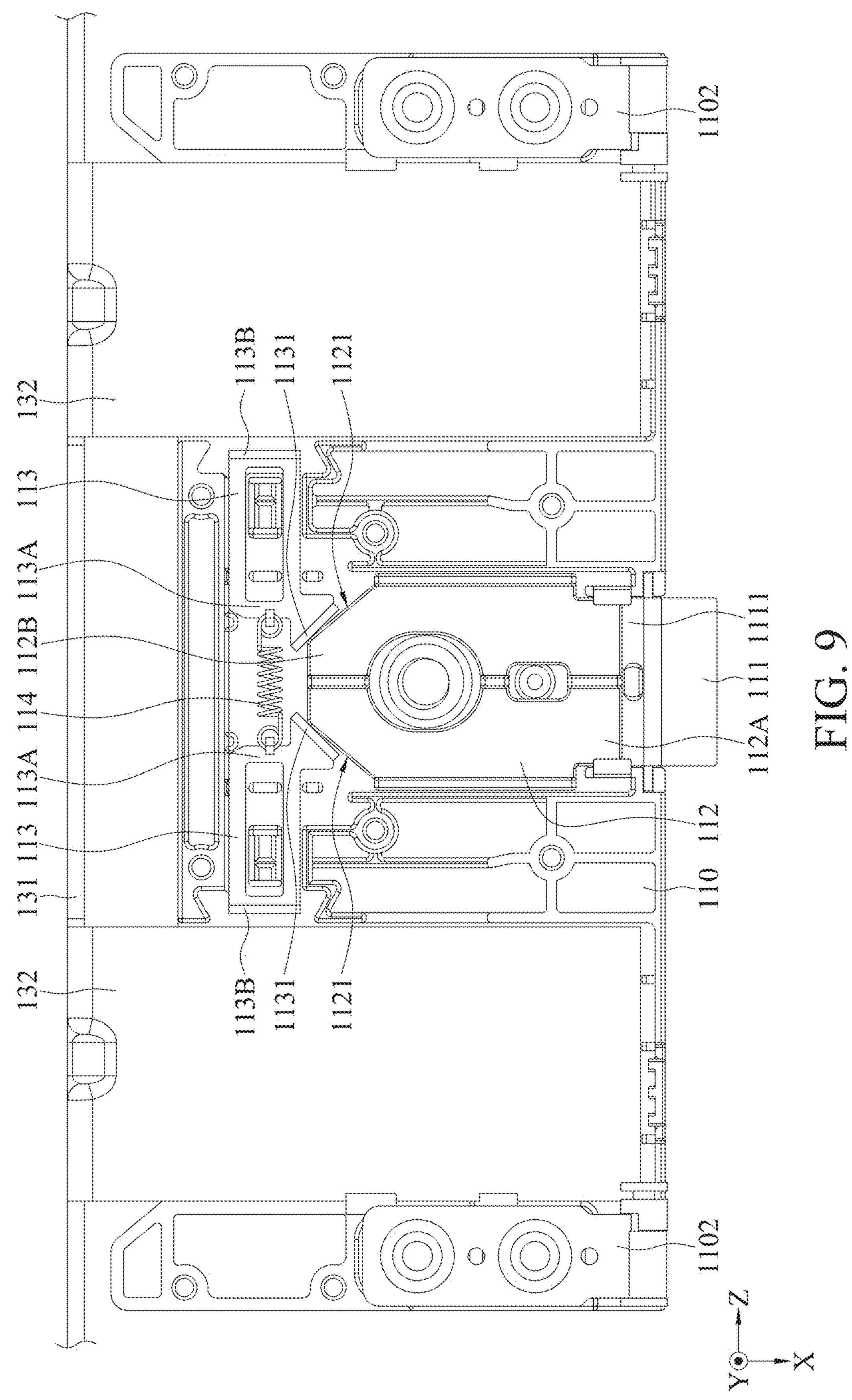
FIG. 9 is a bottom view of a support assembly according to some embodiments.

Refer to FIG. 9. FIG. 9 is a bottom view of a support assembly according to some embodiments. FIG. 9 omits a housing on a top side of a bracket main body 110, to clearly illustrate an internal structure. The foregoing embodiments disclose that the extension portion 132 has a limiting structure, but is not limited thereto. Alternatively, the extension portion 132 may not be provided with a limiting structure. As shown in FIG. 9, both a surface of a side of the extension portion 132 toward the second sliding member 113 and a surface of a side of the second sliding member 113 toward the extension portion 132 have no limiting structure. In the embodiments, a friction force of contact surfaces between the extension portion 132 and the second sliding member 113 is increased, to avoid movement of the bracket 11 relative to the frame 13 along the X-axis. To increase the friction force, the contact surfaces between the extension portion 132 and second sliding member 113 may be, for example, rough surfaces.

Figure 10:
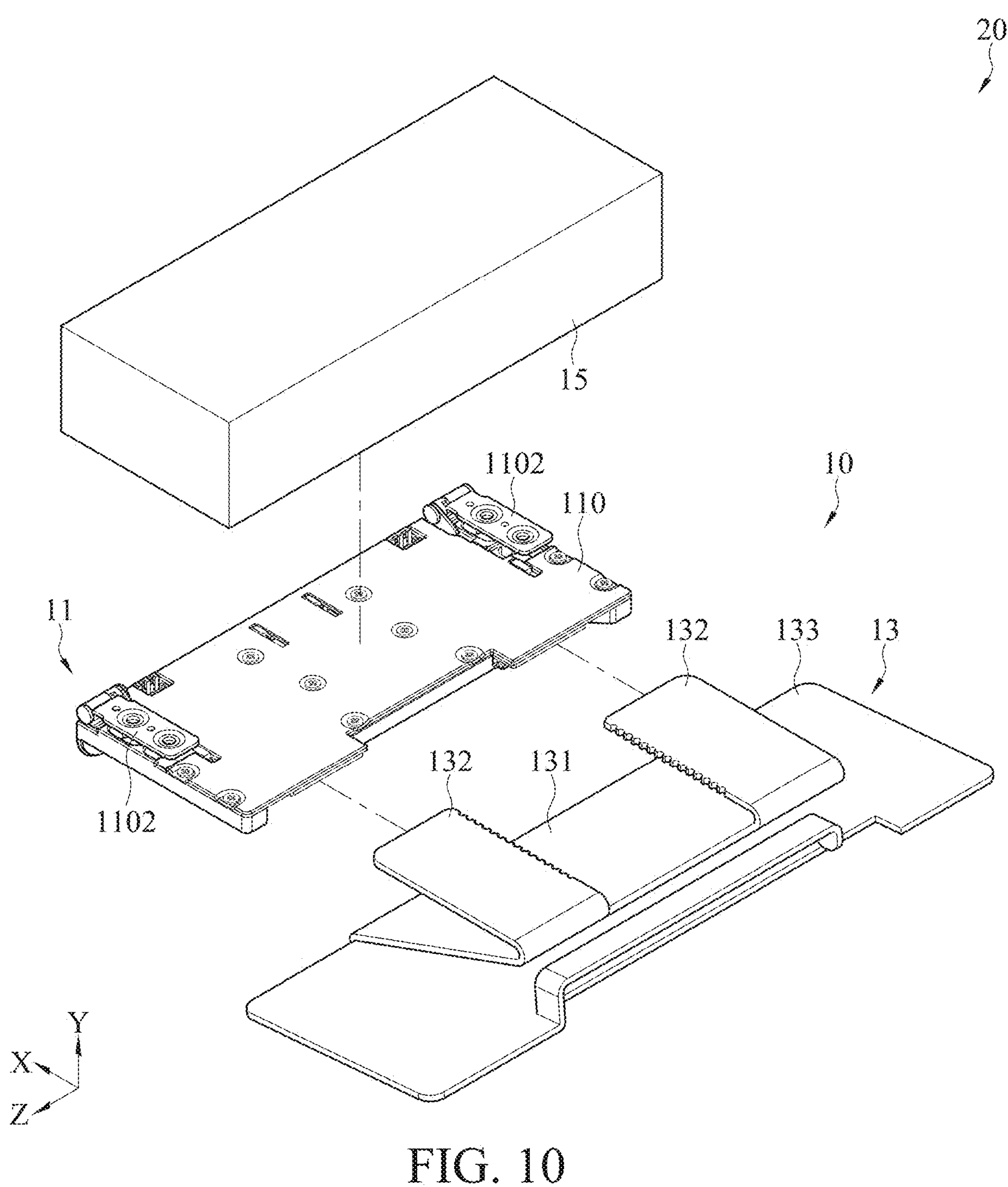
FIG. 10 is a three-dimensional view of an electronic device with an adjustable photographic device according to some embodiments.

Refer to FIG. 10. FIG. 10 is a three-dimensional view of an electronic device with an adjustable photographic device according to some embodiments. As shown in FIG. 10, the frame main body 131 further includes a plane support portion 133 parallel to the extension portion 132. In this way, when the photographic element 15 is assembled on the bracket 11, the frame 13 may be steadily erected on a flat surface such as a desktop through the plane support portion 133.

In summary, an electronic device 20 with an adjustable photographic device and a support assembly 10 thereof are provided in an embodiment. When a user wants to assemble a bracket 11, the user may insert a receiving portion 1101 of the bracket 11 into an extension portion 132 of a frame 13. Then, the user may operate a movable member 111 to pivot the movable member 111, to push a first sliding member 112 through an actuating portion 1111 of the movable member 111, and then enable each second sliding member 113 to contact each extension portion 132, to complete assembly. When the bracket 11 is intended to be disassembled, only the movable member 111 needs to be operated, to keep the second sliding member 113 away from the extension portion 132, so that the bracket 11 can be disassembled from the frame 13. In this way, the user can quickly and intuitively disassemble the bracket 11. Alternatively, the frame 13 may be fixed to a different position based on a usage requirement.

What is claimed is:

1. A support assembly, comprising:

a bracket, including:
- a bracket main body, having a receiving portion;
- a movable member, pivot-connected to the bracket main body, and including an actuating portion;
- a first sliding member, having a first end and a second end opposite to each other, and movable relative to the bracket main body along a first direction, wherein the actuating portion of the movable member is in contact with the first end, and the second end of the first sliding member includes one or more contacting surfaces; and
- one or more second sliding members, wherein the one second sliding member or each of the second sliding members includes a third end and a fourth end opposite to each other, and, the one second sliding member or the second sliding members are movable relative to the bracket main body along a second direction different from the first direction; the third end of the one second sliding member or each of the second sliding members includes a force-receiving portion; and the one contacting surface or each of the contacting surfaces of the first sliding member is in contact with the force-receiving portion of the one second sliding member or each of the second sliding members; and a frame, including:
- a frame main body; and
- one or more extension portions, connected to the frame main body, and the extension portions detachably located in the receiving portion;

wherein the fourth end of the one second sliding member or each of the second sliding members is in selective contact with the one extension portion or each of the extension portions.

2. The support assembly according to claim 1, wherein the bracket further comprises an elastic element, two second sliding members, and the elastic element is located between the two second sliding members and connected to the two second sliding members.

3. The support assembly according to claim 1, wherein a side of the one extension portion or each of the extension portions toward the one second sliding member or the second sliding members includes a limiting structure, and when the fourth end of the one second sliding member or each of the second sliding members is in contact with the corresponding extension portion, the limiting structure limits movement of the bracket along the first direction.

4. The support assembly according to claim 3, wherein the limiting structure is a tooth-shaped limiting portion, the bracket further comprises two elastic pieces, each of two elastic pieces includes an engaging portion corresponding to a shape of the limiting portion, and when the fourth end of the one second sliding member or each of the second sliding members is in contact with the one extension portion or each of the extension portions, the engaging portion is in contact with the corresponding extension portion.

5. The support assembly according to claim 4, wherein the engaging portion is formed by two ends of two elastic pieces being bent toward the one extension portion or each of the extension portions.

6. The support assembly according to claim 3, wherein the limiting structure is a tooth-shaped limiting portion, the fourth end of one second sliding member or each of the second sliding members includes a tooth section arranged along the first direction, when the extension portions of the frame extend into the receiving portion of the bracket, each tooth section corresponds to the limiting portion, and when the fourth end of each of the one second sliding member or the second sliding members is in contact with each of the one extension portion or each of the extension portions, the tooth section of one second sliding member or each of the second sliding members is engaged with the corresponding limiting portion.

7. The support assembly according to claim 3, wherein the limiting structure is a convex portion protruding toward a side of one second sliding member or each of the second sliding members, the fourth end of one second sliding member or each of the second sliding members includes a concave portion recessed inward along the second direction, when two extension portions of the frame extend into the receiving portion of the bracket, the convex portion corresponds to the concave portion, and when the fourth end of the one second sliding member or each of the second sliding members is in contact with the one extension portion or each of the extension portions, the concave portion of the one second sliding member or each of the second sliding members is engaged with the corresponding convex portion.

8. The support assembly according to claim 3, wherein the limiting structure is a concave portion recessed inward at the side of the one extension portion or each of the extension portions toward the one second sliding member or the second sliding members, the fourth end of the one second sliding member or each of the second sliding members includes a convex portion protruding outward along the second direction, when two extension portions of the frame extend into the receiving portion of the bracket, each convex portion corresponds to the concave portion, and when the fourth end of the one second sliding member or each of the second sliding members is in contact with the one extension portion or each of the extension portions, the convex portion of the one second sliding member or each of the second sliding members is engaged with the corresponding concave portion.

9. The support assembly according to claim 3, wherein the limiting structure is an anti-slip sheet, attached to the side of the one extension portion or each of the extension portions toward the one second sliding members or the second sliding members.

10. The support assembly according to claim 1, wherein the frame main body further comprises a plane support portion.

11. A bracket, comprising:

a bracket main body, having a receiving portion;

a movable member, pivot-connected to the bracket main body, and comprising an actuating portion;

a first sliding member, having a first end and a second end opposite to each other, and movable relative to the bracket main body along a first direction, wherein the actuating portion of the movable member is in contact with the first end, and the second end of the first sliding member includes one or more contacting surfaces; and one or more second sliding members, the one second sliding member or each of the second sliding members having a third end and a fourth end opposite to each other, and, the one second sliding member or each of the second sliding members are movable relative to the bracket main body along a second direction different from the first direction, wherein the third end of one second sliding member or each of the second sliding members includes a force-receiving portion, and the one contacting surface or each of the contacting surfaces of the first sliding member is in contact with the force-receiving portion of the one second sliding member or each of the second sliding members.

12. The bracket according to claim 11, wherein the bracket further comprises an elastic element, two second sliding members, and the elastic element is located between the two second sliding members and connected to the two second sliding members.

13. The bracket according to claim 11, wherein the bracket further comprises two elastic pieces, and two ends of each elastic piece are bent outward to form an engaging portion is formed by two ends of two elastic pieces being bent toward the one extension portion or each of the extension portions.

14. The bracket according to claim 11, wherein the fourth end of one second sliding member or each of the second sliding members includes a tooth section arranged along the first direction.

15. The bracket according to claim 11, wherein the fourth end of the one second sliding member or each of the second sliding members includes a concave portion recessed inward along the second direction.

16. The bracket according to claim 11, wherein the fourth end of the one second sliding member or each of the second sliding members includes a convex portion protruding outward along the second direction.

17. An electronic device with an adjustable photographic device, comprising:

a bracket, including:

a bracket main body, having a receiving portion;

a movable member, pivot-connected to the bracket main body, and including an actuating portion;

a first sliding member, having a first end and a second end opposite to each other, and movable relative to the bracket main body along a first direction, wherein the actuating portion of the movable member is in contact with the first end, and the second end of the first sliding member includes one or more contacting surfaces; and one or more second sliding members, the one second sliding member or each of the second sliding members having a third end and a fourth end opposite to each other, and, the one second sliding member or the second sliding members are movable relative to the bracket main body along a second direction different from the first direction, wherein the third end of the one second sliding member or each of the second sliding members includes a force-receiving portion; and the one contacting surface or each of the contacting surfaces of the first sliding member is in contact with the force-receiving portion of the one second sliding member or each of the second sliding members;

a frame, including:

a frame main body; and one or more extension portions, connected to the frame main body, and the extension portions detachably located in the receiving portion; and a photographic element, fixed to the bracket main body, and pivotable relatively to the bracket;

wherein, the fourth end of the one second sliding member or each of the second sliding member selectively is in contact with the one extension portion or each of the extension portions.

18. The electronic device with an adjustable photographic device according to claim 17, wherein a side of the one extension portion or each of the extension portions toward the one second sliding member or each of the second sliding members includes a limiting structure, and when the fourth end of the one second sliding member or each of the second sliding members is in contact with the corresponding extension portion, the limiting structure limits movement of the bracket along the first direction.

19. The electronic device with an adjustable photographic device according to claim 18, wherein the limiting structure is a tooth-shaped limiting portion, the bracket further comprises two elastic pieces, each of two elastic pieces includes an engaging portion corresponding to a shape of the limiting portion, and when the fourth end of the one second sliding member or each of the second sliding members is in contact with the one extension portion or each of the one extension portions, the engaging portion is in contact with the corresponding extension portion.

20. The electronic device with an adjustable photographic device according to claim 17, wherein the bracket main body further includes two connecting arms, the two connecting arms are connected to the bracket main body, and the photographic element is fixed to the two connecting arms.

* * * * *